Feb. 24, 1959 — A. W. McDANIEL — 2,875,002
PLAIN SELF-ALIGNING BEARING
Filed Oct. 11, 1956

INVENTOR
ALDEN W. McDANIEL
BY
ATTORNEYS

United States Patent Office 2,875,002
Patented Feb. 24, 1959

2,875,002

PLAIN SELF-ALIGNING BEARING

Alden W. McDaniel, Washington, D. C.

Application October 11, 1956, Serial No. 615,436

4 Claims. (Cl. 308—72)

(Granted under Title 35, U. S. Code (1952), sec. 266)

The invention described herein may be manufactured and used by or for the Government of the United States of America for governmental purposes without the payment of any royalties thereon or therefor.

The present invention relates to a plain self-aligning bearing and more particularly a plain spherical bearing having oppositely protruding trunnions that provide a means for self-aligning the bearing.

Present plain spherical bearings are manufactured by swaging or spinning a bronze outer race over a hardened steel inner ball. The resulting spring back of the bronze outer race, increasing away from the race center line, results in axial slope in the bearing and almost line contact of the ball in the outer race instead of the desired spherical mating. Under high loading, function between the ball and outer race of the plain spherical bearings induces rotation of the inner race on the supporting bolt or pin resulting in scoring and/or galling of the bolt. Recently conducted tests have indicated an inability to correct this motion. For example, repeated loading of a known size 16 plain spherical bearing sheared off a .25 inch diameter shear pin placed to immobilize a 1.0 inch diameter bolt in a clevis. Also, to correct for misalignment of the presently used bearings, an excessive number of elements are needed.

In the present invention, the plain spherical self-aligning bearing has two basic parts, namely: an inner bearing member and an outer socket member, said latter member being in the shape of a hollow cylinder. The inner bearing member has a central hole therein to provide for rotation around a bolt, and two oppositely protruding flattened trunnions to provide for alignment motion in the outer socket member. The outer socket member is provided with saddles having intersecting slots therein which permit insertion of the flattened trunnions of the inner bearing member in the socket member after a 90° rotation of the ball member about the trunnion axis.

Thus, it can readily be seen that the disadvantages noted above with known plain spherical bearings have been eliminated by the present invention as the commonly used ball and race have been omitted. Further, due to the coaction of the trunnions and the saddles, the serious problem of misalignment has been corrected with a minimum number of parts.

An object of the present invention is the provision of a plain spherical bearing which will provide less friction to the attaching bolt than any known plain spherical bearing.

Another object is to provide a plain spherical bearing that is self-aligning.

Still another object is to provide a bearing whose parts can be easily assembled or replaced when necessary.

A final object is to provide a self-aligning bearing having a minimum number of easily manufactured parts.

Other objects and many of the attendant advantages of this invention will be readily appreciated as the same becomes better understood by reference to the following detailed description when considered in connection with the accompanying drawings wherein.

Figure 1:
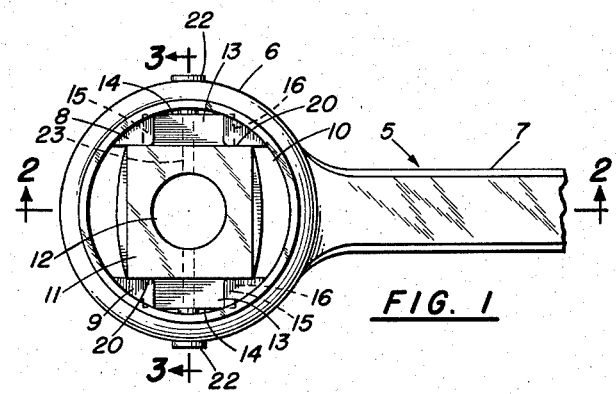
Fig. 1 is a side elevation of a plain spherical bearing according to the invention incorporated in a connecting rod.

Referring now to the drawings, wherein like reference characters designate like or corresponding parts throughout the several views, there is shown in Fig. 1 a connecting rod 5 having a socket member 6 positioned at the end of a stem or shank 7 which can be externally threaded and is adapted to be connected to an associated operating part, not illustrated.

The socket member 6 is generally spherical and has an internal surface 10 whereon oppositely protruding saddles 8 and 9 are provided and extend inwardly toward the center of said socket member, as best seen in Fig. 1, to provide bearing surfaces.

An inner bearing member 11 having a central opening 12 and oppositely protruding trunnions 13 is adapted to be mounted within said socket member 6. The trunnions 13 are received in the saddles 8 and 9 and coact therewith to provide a bearing support, as well as a means of self-alignment for the bearing to be discussed in greater detail hereinafter.

The saddles 8 and 9 are each provided with an axial slot 14 and a pair of recesses 15 (Figs. 1 and 4) in each of the walls of the slots 14. The recesses 15 provided in the saddles 8 and 9 have side walls 16 that present an internally curved bearing surface adapted to coact with a corresponding bearing surface on the trunnions 13.

Figure 4:
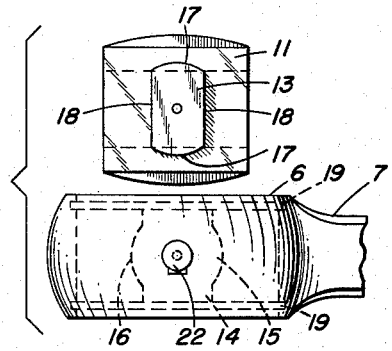
Fig. 4 is an exploded view illustrating the manner in which the bearing member is either assembled or disassembled with the socket member.
Figure 3:
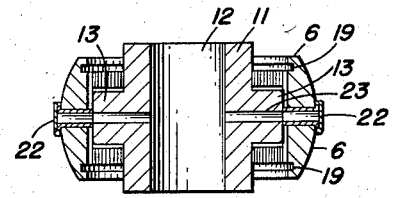
Fig. 3 is a cross-section of the bearing taken on line 3—3 of Fig. 1.

The trunnions 13 protruding from the inner bearing member 11 are provided with oppositely curved bearing surfaces 17 (Fig. 4) and flat non-bearing surfaces 18 intermediate said bearing surfaces 17. The width of the flat non-bearing surfaces 18 of the trunnions 13 is such as to permit the trunnions 13 to be inserted within the axial slot 14 when the inner bearing member is in edgewise position as shown in Fig. 4. The curvature of the oppositely curved bearing surfaces 17 corresponds to the curvature of the side walls 16 of the recesses 15.

The saddles 8 and 9 have protruding shoulders 20 that engage the ends of the inner bearing member 11 to aid in providing a bearing support and self-aligning means for the inner bearing member 11 within the socket member 6. Close tolerances are provided to all bearing surfaces 16, 17, 20 and the end walls of the inner bearing member 11.

Thus, in assembling the inner bearing member 11 within the socket member 6 the operation is simple and as follows: the inner bearing member 11 is introduced into the socket member 6 as shown in Fig. 4 where the trunnions 13 pass into the axial slot 14; when the trunnions 13 are positioned in the center of axial slot 14 the inner bearing member 11 is rotated 90° which in turn rotates the trunnions 13 whereby the curved bearing surfaces 17 of the trunnions 13 are in bearing engagement with the curved bearing surfaces of the side walls 16 of recesses 15, as shown in Fig. 1.

The coaction between the curved bearing surfaces 16 and 17 provide a simple but dependable means for allowing the inner bearing member 11 to remain in alignment when a pin or the like is received in the central opening 12 of inner bearing member 11.

Figure 2:
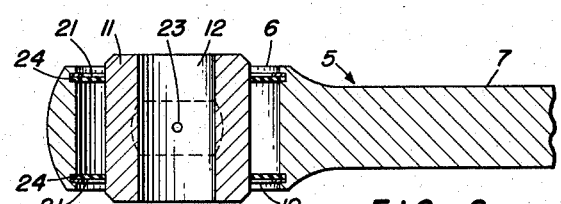
Fig. 2 shows a cross-section taken on the line 2—2 of Fig. 1.

The socket member 6 has internal grooves 19 at each edge to receive flexible seal discs 21 retained by snap rings 24 (Fig. 2) and is also provided with snap disc type lubricating fittings 22 at each end of the trunnion axis for lubricating the trunnion surfaces and the central opening 12 in the inner bearing member 11. Lubricating openings 23 are provided in the inner bearing member 11 and trunnions 13 and are in alignment with the lubrication fittings 22 to receive lubricant therefrom.

Obviously many modifications and variations of the present invention are possible in the light of the above teachings. It is therefore to be understood that within the scope of the appended claims the invention may be practiced otherwise than as specifically described.

I claim:

1. In a plain spherical bearing, the combination of a hollow cylindrical member having an internal surface, an inner bearing member having a central opening therein and oppositely protruding radial trunnions positioned within said cylindrical member, said trunnions having opposed cylindrically curved bearing portions and non-bearing portions between and of a lesser width than the diameter of said bearing portions, saddles positioned in diametrically opposite relationship on said internal surface receiving said trunnions, each of said saddles having an axial slot and a recess in each wall of each slot, said slots on each of said saddles being in operatively opposed relationship with each other, the side walls of said recesses having internally cylindrically curved bearing surfaces adapted to coact with the cylindrically curved bearing portions on said trunnions, said axial slots being wider than the non-bearing portions of said trunnions so as to permit the introduction of the inner bearing member into the cylindrical member when presented edgewise thereto.

2. The combination set forth in claim 1 wherein said cylindrical member and saddles are provided with radially extending lubricating means, and said radial trunnions have corresponding lubricating means therethrough opening into said central opening whereby said central opening can be provided with lubrication as well as said trunnions.

3. In a plain spherical bearing; a hollow cylindrical member having an internal surface, an inner bearing having a central opening therein, trunnion means protruding from opposite sides of said inner bearing member, oppositely disposed saddle means on the internal surface of said cylindrical member receiving said oppositely protruding trunnion means, said trunnion means having bearing surfaces thereon, said cylindrical member and said trunnion means having lubrication passages therein for lubricating said bearing surfaces and the central opening in said inner bearing member, said saddle means having an axial slot and a bearing recess intersecting said slot, whereby said trunnion means is adapted to be inserted into said slot of said saddle means when the inner bearing member is presented edgewise thereto.

4. In a plain spherical bearing; a hollow cylindrical member having an internal surface, an inner bearing member having a central opening therein, oppositely protruding trunnions positioned within said cylindrical member, said trunnions having curved bearing portions thereon, said hollow cylindrical member, said trunnions and said inner bearing member having lubricating passages therein whereby said central opening and said bearing portions can be lubricated, saddles positioned in diametrically opposite relationship on said internal surface receiving said trunnions, each of said saddles having a pair of recesses therein oppositely disposed with respect to each other, the side walls of said recesses having internally curved bearing surfaces receiving and coacting with the curved bearing portions on said trunnions whereby the curved bearing surfaces and portions allow the inner bearing member to be self-aligned within said cylindrical member.

References Cited in the file of this patent

UNITED STATES PATENTS 1,478,324     Dina _____ Dec. 18, 1923

FOREIGN PATENTS 8,465     Great Britain _____ 1908